United States Patent
Namkung

(10) Patent No.: US 9,869,878 B2
(45) Date of Patent: Jan. 16, 2018

(54) FLEXIBLE TOUCH SCREEN PANEL AND FLEXIBLE TOUCH SCREEN DISPLAY DEVICE

(71) Applicant: Samsung Display Co., Ltd., Yongin-si (KR)

(72) Inventor: Jun Namkung, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 37 days.

(21) Appl. No.: 14/969,489

(22) Filed: Dec. 15, 2015

(65) Prior Publication Data

US 2016/0291780 A1 Oct. 6, 2016

(30) Foreign Application Priority Data

Apr. 6, 2015 (KR) .................. 10-2015-0048606

(51) Int. Cl.
*G06F 3/041* (2006.01)
*G02B 27/28* (2006.01)
*G06F 3/044* (2006.01)

(52) U.S. Cl.
CPC .......... *G02B 27/286* (2013.01); *G06F 3/044* (2013.01); *G06F 3/0412* (2013.01); *G06F 2203/04102* (2013.01)

(58) Field of Classification Search
CPC ............................ G06F 3/044; G06F 3/03547
USPC ................................................. 345/173–174
See application file for complete search history.

(56) References Cited

U.S. PATENT DOCUMENTS

| 7,936,121 | B2 | 5/2011 | Kim | |
| 2011/0175671 | A1* | 7/2011 | Reynolds | G06F 3/044 327/517 |
| 2013/0162596 | A1* | 6/2013 | Kono | G06F 3/044 345/174 |
| 2014/0132553 | A1* | 5/2014 | Park | G06F 3/044 345/174 |
| 2014/0139447 | A1 | 5/2014 | Kang et al. | |
| 2015/0014644 | A1 | 1/2015 | Namkung et al. | |
| 2015/0070309 | A1* | 3/2015 | Kang | G06F 3/044 345/174 |

FOREIGN PATENT DOCUMENTS

| KR | 10-0873080 | 12/2008 |
| KR | 10-2014-0062269 | 5/2014 |
| KR | 10-2014-0064259 | 5/2014 |

* cited by examiner

*Primary Examiner* — Roy Rabindranath
(74) *Attorney, Agent, or Firm* — H.C. Park & Associates, PLC

(57) ABSTRACT

A flexible touch screen panel includes a thin film substrate including a first section and a second section and first sensing electrodes disposed in the first section and the second section, the first sensing electrodes being connected to one another along a first direction. The first sensing electrodes include a first stack structure in the first section and a second stack structure in the second section, the second stack structure being different from the first stack structure.

19 Claims, 9 Drawing Sheets

FLEXIBLE TOUCH SCREEN PANEL AND FLEXIBLE TOUCH SCREEN DISPLAY DEVICE

CROSS-REFERENCE TO RELATED APPLICATION

This application claims priority from and the benefit of Korean Patent Application No. 10-2015-0048606, filed on Apr. 6, 2015, which is hereby incorporated by reference for all purposes as if fully set forth herein.

BACKGROUND

Field

Exemplary embodiments relate to a flexible touch screen panel and a flexible touch screen display device. In particular, exemplary embodiments relate to a flexible touch screen panel to reduce mechanical bending stress and a flexible touch screen display device including the same.

Discussion

Demand exists for flexible touch screen panels that may be attached to or implemented as a single body with a flexible display device. Such flexible touch screen panels and flexible touch screen display devices including a flexible touch screen panel may be flexible through the use of a flexible thin film substrate versus a thick glass (or metal) substrate.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a flexible touch screen panel configured to reduce mechanical bending stress and a flexible touch screen display device to reduce mechanical bending stress.

Additional aspects will be set forth in the detailed description which follows, and, in part, will be apparent from the disclosure, or may be learned by practice of the inventive concept.

According to one or more exemplary embodiments, a flexible touch screen panel includes a thin film substrate including a first section and a second section and first sensing electrodes disposed in the first section and the second section. The flexible touch screen panel also includes the first sensing electrodes being connected to one another along a first direction. The first sensing electrodes include a first stack structure in the first section and a second stack structure in the second section, the second stack structure being different from the first stack structure.

According to one or more exemplary embodiments, a flexible touch screen display device includes a display pattern layer configured to display an image, a touch screen pattern layer disposed on the display pattern layer, the touch screen pattern layer including an area configured to detect a touch interaction, and a flexible substrate disposed between the display pattern layer and the touch screen pattern layer. The area includes a first section comprising a first stack structure and a second section disposed outside the first section, the second section comprising a second stack structure. The second stack structure is thicker than the first stack structure.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
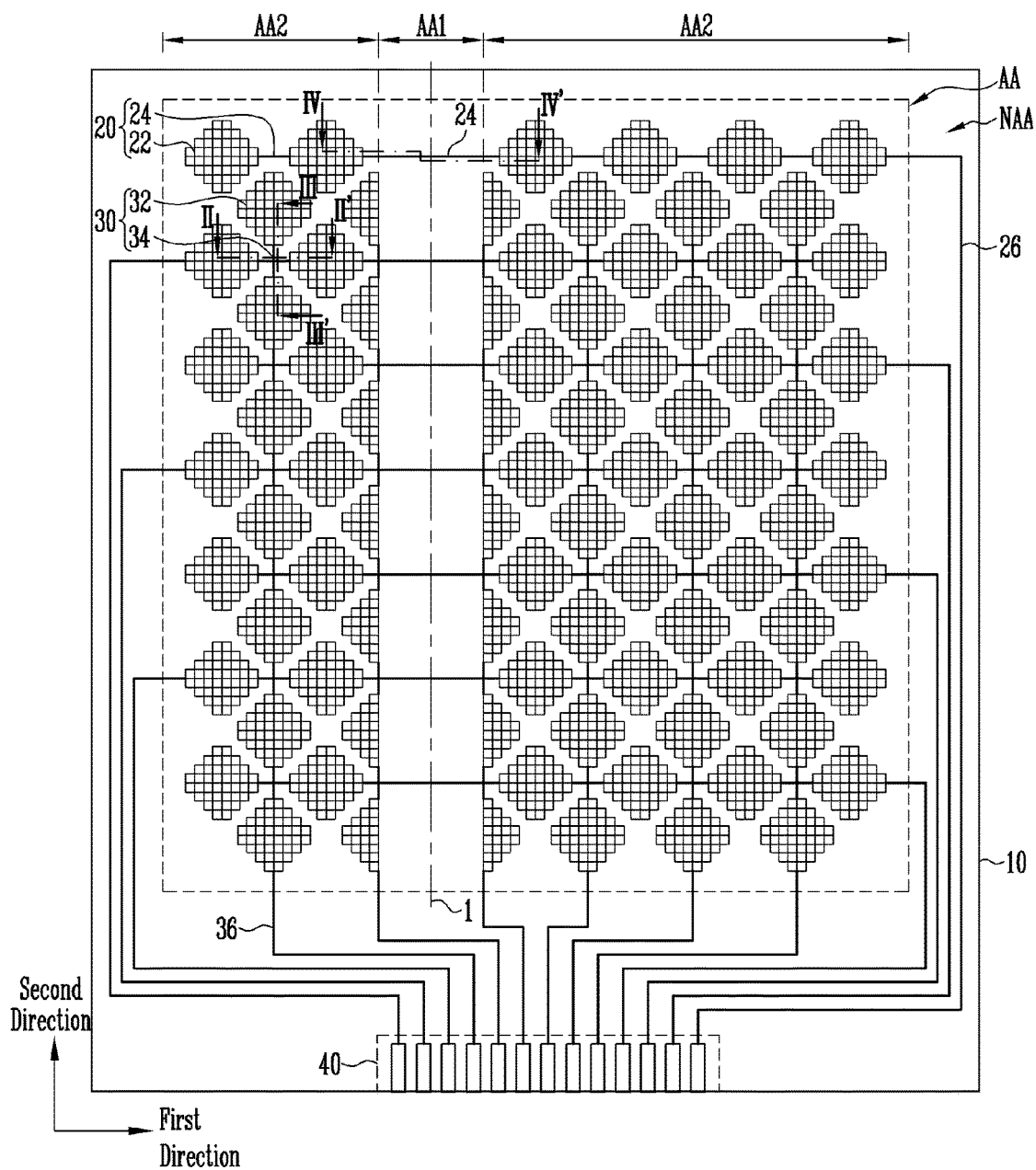
FIG. 1 is a plan view of a flexible touch screen panel according to one or more exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms "first," "second," etc. may be used herein to describe various elements, components, regions, layers, and/or sections, these elements, components, regions, layers, and/or sections should not be limited by these terms.

These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a plan view of a flexible touch screen panel, according to one or more exemplary embodiments. FIG. 1 illustrates a flexible touch screen panel including sensing electrodes coupled in different directions. Exemplary embodiments, however, are not limited to sensing electrodes coupled in different directions. For instance, sensing electrodes may be coupled in any suitable direction, whether the same direction or some combination of directions. Furthermore, although FIG. 1 illustrates the sensing electrodes being formed in mesh patterns, exemplary embodiments are not limited to sensing electrodes formed in mesh patterns. The sensing electrodes may be implemented in any suitable shape, arrangement, or formation.

Referring to FIG. 1, a flexible touch screen panel includes a thin film substrate 10 (also referred to as a second substrate 10), first sensing electrodes 20, and second sensing electrodes 30, outer wires 26 and 36, and a pad portion 40. The first sensing electrodes 20 and the second sensing electrodes 30 may be formed in an active area AA of the thin film substrate 10, whereas the outer wires 26 and 36, as well as the pad portion 40 may be formed outside the active area AA, such as, in a non-active area NAA of the thin film substrate 10.

The thin film substrate 10 may be implemented as a flexible thin film, such as polyimide (PI) film. However, it is contemplated that any suitable flexible thin film may be utilized in association with exemplary embodiments described in this application. The active area AA may sense touch inputs (or "near" touch events such as hovering events) and the non-active area NAA may be located along a peripheral area of the active area AA.

The active area AA may be divided into a first section AA1 and a second section AA2. The first section AA1 may be designed as a flexible section to withstand repeated and intentional bending, folding, rolling, twisting, etc., events. For brevity, the terms "bending," "folding," "rolling," and "twisting" will be referred to collectively as "bending." A bending axis 1, longitudinally extending in a second direction (i.e., a substantially vertical direction), may be disposed in the first section AA1. Upper and lower portions of the non-active area NAA disposed in association with the first section AA1 may also be designed as flexible.

A remaining area of the active area AA (i.e., the area excluding the first section AA1) may form the second section AA2. The second section AA2 may be a non-flexible section (i.e., not designed to withstand repeated bending events). The non-flexible section may include a relatively hard or rigid section that is incapable of bending or folding. In other words, the non-flexible section may be relatively rigid, but at least less flexible than the first section AA1. In this manner, the first section AA1 may be easily and intentionally flexed, whereas the second section AA2 may be difficult to flex without potentially harming the flexible touch screen panel. Conventional touch screen panels are not divided into flexible and non-flexible sections. As such, conventional touch screen panels may include first and second sensing electrodes that are uniformly distributed in an active area. However, the flexible touch screen panel according to one or more exemplary embodiments includes a flexible section (e.g., at least the first section AA1) that is sufficiently flexible to undergo repeated and intentional bending events.

In one or more exemplary embodiments, first coupling portions 24 may be formed in the first section AA1 of the flexible touch screen panel. Thus, the first section AA1 may have a reduced thickness and enhanced flexibility compared to the second section AA2, which includes first sensing cells 22 and second sensing cells 32.

The first sensing electrodes 20 and the second sensing electrodes 30 may be disposed in the active area AA to detect touch inputs. The first sensing electrodes 20 and the second sensing electrodes 30 may be arranged in directions that cross each other. For example, the first sensing electrodes 20 may be coupled to one another along a first direction (i.e., a substantially horizontal) that crosses the first section AA1. In this manner, the first sensing electrodes 20 disposed in the second sections AA2 may be coupled to one another in the first direction via the first coupling portions 24 disposed in the first section AA1. As shown in FIG. 1, at least some of the first sensing electrodes 20 may be disposed at a first side (e.g., a left side) of the first section AA1 and at least some of the first sensing electrodes 20 may be disposed at a second side (e.g., a right side) of the first section AA1. In this manner, the first sensing electrodes 20 disposed at opposing sides of the first section AA1 may be connected to one another in the first direction via first coupling portions 24 disposed in the first section AA1. It is also noted that groups of the first sensing electrodes 20 may be respectively coupled to the pad portion 40 via corresponding outer wires 26, which are disposed in the non-active area NAA. It is contemplated that portions of the outer wires 26 may extend into the active region AA to couple to a corresponding group of the first sending electrodes 20. It is also contemplated that at least some of the first sensing electrodes 20 may include a portion disposed at a lateral edge of the active area AA, such that the outer wires 26 remain in the non-active area NAA.

In one or more exemplary embodiments, the second sensing electrodes 30 are coupled together along a second direction (i.e., a substantially vertical direction). The second direction may longitudinally extend parallel to a longitudinal direction of extension of the first section AA1. To this end, the second direction crosses the first direction, such as perpendicularly (or substantially perpendicularly) crosses the first direction. Although the first direction is illustrated as a horizontal direction and the second direction is illustrated as a vertical direction, the first and second directions may be any direction that crosses one another. For example, the first direction and section direction may traverse the thin film substrate 10 in non-horizontal and non-vertical directions (i.e., diagonally traverse the thin film substrate 10). It is also contemplated that the first and second directions may cross one another in a non-perpendicular manner. In other words, the first and second directions may be non-orthogonal.

In one or more exemplary embodiments, the first and second sensing electrodes 20 and 30 are formed in metal pattern including fine metal lines. For example, the mesh patterns may be metal mesh patterns. First and second sensing electrodes 20 and 30 in mesh patterns utilizing a malleable metal material may improve the flexibility of the flexible touch screen panel. It is contemplated that any other suitable material may be utilized in association with exemplary embodiments. For example, a conductive polymer may be used.

The first sensing electrodes 20 may include first sensing cells 22 arranged in lines along the first direction. To this end, first coupling portions 24 may be disposed between and couple adjacent first sensing cells 22 to one another. In this manner, the first coupling portions 24 may act as bridges between adjacent first sensing cells 22 arranged on a same line. Further, the first coupling portions 24 may form a single body with the first sensing cells 22 via at least one conductive layer forming a portion of the first sensing cells 22. Although the first coupling portions 24 are illustrated in FIG. 1 as single fine lines, the first coupling portions 24 are not limited to single fine lines. For instance, the first coupling portions 24 may be configured as two or more fine lines, which may be disposed adjacent to one another in a plan view or overlap one another.

The second sensing electrodes 30 may include second sensing cells 32 arranged in lines along the second direction. In this manner, second coupling portions 34 may be disposed between and couple adjacent second sensing cells 32 to one another. The second coupling portions 34 may act as bridges between adjacent second sensing cells 32 arranged on a same line. Further, the second coupling portions 34 may form a single body with the second sensing cells 32 via at least one conductive layer forming a portion of the second sensing cells 32. Although FIG. 1 depicts the second coupling portions 34 as single fine lines, the second coupling portions 34 are not necessarily limited to single fine lines. For example, the second coupling portions 34 may be configured as two or more fine lines, which may be disposed adjacent to one another in a plan view or overlap one another.

In one or more exemplary embodiments, the first and second sensing cells 22 and 32 may be formed as multi-layer structures including multiple conductive layers. The first and second coupling portions 24 and 34 may be formed as single layer structures including a single conductive layer.

The first coupling portions 24 and the second coupling portions 34 may be disposed on different layers than one another with an insulating layer (e.g., second passivation layer 14) disposed between the first coupling portions 24 and the second coupling portions 34. For example, if the first coupling portions 24 are formed as part of a lower conductive layer, the second coupling portions 34 may be formed as part of an upper conductive layer, or vice versa. The insulating layer (e.g., second passivation layer 14) may be configured to prevent a short circuit.

The first outer wires 26 may couple groups of the first sensing electrodes 20 to the pad portion 40, whereas the second outer wires 36 may couple groups of the second sensing electrodes 30 to the pad portion 40. In this manner, the first sensing electrodes 20 and/or the second sensing electrodes 30 may receive a driving signal from the pad portion 40 and/or transmit a sensing signal to the pad portion 40.

In one or more exemplary embodiments, the first sensing electrodes 20 crossing the first section AA1 may have a different cross section structure in the first section AA1 and the second section AA2. In other words, the first sensing electrodes 20 crossing the first section AA1 may have a different stacking structure in the first section AA1 and the second section AA2.

In one or more exemplary embodiments, the first sensing cells 22 are distributed only in the second section AA2. Only the first coupling portions 24 may be disposed in the first section AA1 such that each of the first sensing electrodes 20 is not disconnected in the first section AA1.

In one or more exemplary embodiments, the first sensing electrodes 20 include first sensing cells 22 distributed only in the second section AA2 and first coupling portions 24 coupling the first sensing cells 22 along the first direction and distributed in the first section AA1 and the second section AA2.

Here, the first sensing electrodes 20 may be implemented as a single layer structure including only one conductive layer in the first section AA1 and as a multi-layer structure including at least two conductive layers in the second section AA2.

In one or more exemplary embodiments, the second sensing electrodes 30 are disposed in the second section AA2 (i.e., the section of the active area AA that excludes the first section AA1).

More specifically, the second sensing electrodes 30 may include second sensing cells 32 distributed in the second section AA2 and second coupling portions 34 coupling the second sensing cells 32 along the second direction and distributed in the second section AA2.

The cross section structure of the first and second sensing electrodes 20 and 30 will be described in detail below.

As described above, in one or more exemplary embodiments, only first coupling portions 24 cross the first section AA1 because the first section AA1 is designed as a flexible section and the first coupling portions connect first sensing electrodes 20. The first and second sensing cells 22 and 32 and the second coupling portions 34 may be partially removed from the first section AA1 to help achieve flexibility in the first section.

Accordingly, the first section AA1 may be thinner than the second section AA2 improving the flexibility of the first section AA1 as well as reducing the mechanical bending stress of the first section.

Touch input in the active area AA may deteriorate if the width of the first section is too wide. Thus, a width of the first section AA1 may be designed to be sufficiently narrow to prevent touch input deterioration.

Figure 2:
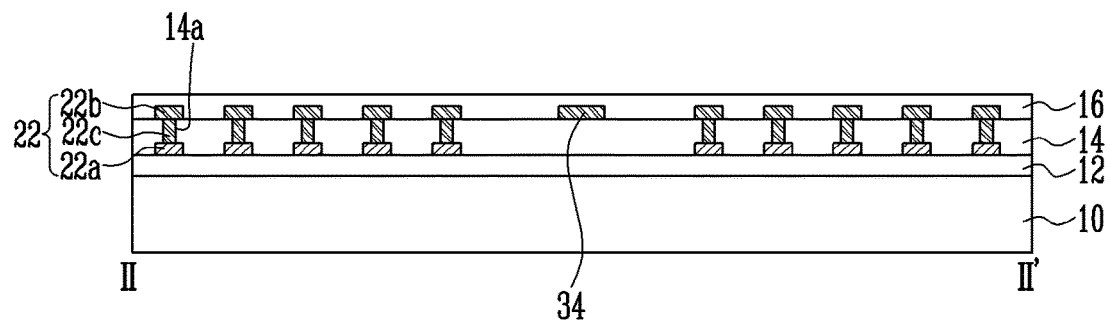
FIG. 2 is a cross-sectional view of the flexible touch screen panel of FIG. 1 taken along sectional line II-II' according to one or more exemplary embodiments.

FIG. 2 is a cross sectional view along sectional line II-II' shown in FIG. 1. A cross section of first sensing cells 22 and a cross section of a second coupling portion 34 crossing section line II-II' may be shown from the cross sectional view in FIG. 2. While only one second coupling portion 34 is shown in FIG. 2, FIG. 1 shows multiple second coupling portions 34 are disposed in the active area AA. Thus, the second coupling portion 34 is referred as being multiple second coupling portions 34 when describing FIG. 2.

Referring to FIG. 2, the first sensing cells 22 may have a multi-layer structure including multiple conductive layers, and the second coupling portions 34 may have a single layer structure including one conductive layer.

More specifically, a first passivation layer 12 may be disposed on a thin film substrate 10, and the first sensing cells 22 may be disposed on the first passivation layer 12.

The first sensing cells 22 may include a first conductive layer 22a disposed on the first passivation layer 12 and a second conductive layer 22b disposed on the first conductive layer 22a with a second passivation layer 14 interposed between the first conductive layer 22a and the second conductive layer 22b. The second passivation layer 14 may function as an insulating layer.

As one or more exemplary embodiments, the first and second conductive layers 22a and 22b are formed of metal layer and may be patterned in a mesh pattern as shown in FIG. 1.

The first and second conductive layers 22a and 22b may be electrically coupled through a third conductive layer 22c resulting in a reduced resistance of the first sensing electrodes 20. For example, a contact hole 14a may be formed in a second passivation layer 14 for electrical coupling between the first and second conductive layers 22a and 22b, and a third conductive layer 22c may be disposed in the contact hole 14a.

The third conductive layer 22c may be concurrently formed in the same mask process as the second conductive layer 22b. Alternatively, the third conductive layer 22c may be formed in a separate mask process prior to the process of forming the second conductive layer 22b. For example, the contact hole 14a is formed by etching the second passivation layer 14. Next, the second conductive layer 22b may be formed concurrently while filling the contact hole 14a with a third conductive layer 22c that will be coupled to the second conductive layer 22b. Thus, the third conductive layer 22c may be formed in a single body. As an alternative example, the contact hole 14a is formed by etching the second passivation layer 14. However, the third conductive layer 22c may be disposed to fill the contact hole 14a followed by forming the second conductive layer 22b on the third conductive layer 22c. As one or more exemplary embodiments, the third conductive layer 22c includes a metal layer and is formed in a single body with or formed separately from the second conductive layer 22b. The first sensing cells 22 having multi-layer structure may be formed by the first and second conductive layers 22a and 22b being electrically coupled to each other by the third conductive layer 22c.

The second coupling portions 34 may have a single layer structure implemented with the first conductive layer 22a or the second conductive layer 22b. For example, the second coupling portions 34 have a single layer structure implemented with the second conductive layer 22b of an upper portion of the second passivation layer 14 as shown in FIG. 2.

A third passivation layer 16 may be disposed on upper portions of the first sensing cells 22 and the second coupling portions 34.

Figure 3:
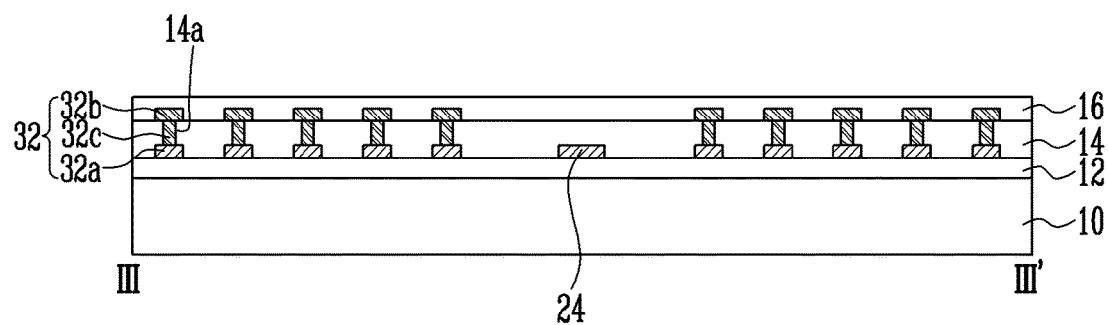
FIG. 3 is a cross-sectional view of the flexible touch screen panel of FIG. 1 taken along sectional line III-III' according to one or more exemplary embodiments.

FIG. 3 is a cross-sectional view of the flexible touch screen panel of FIG. 1 taken along sectional line III-III' according to one or more exemplary embodiments. A cross section of second sensing cells 32 and a cross section of first coupling portion 24 crossing section line III-III' may be observed from the cross sectional view of FIG. 3. When describing FIG. 3, similar features as FIG. 2 will be omitted to avoid obscuring exemplary embodiments disclosed herein. While only one first coupling portion 24 is shown in FIG. 3, FIG. 1 shows multiple first coupling portions 24 are disposed in the active area AA. Thus, the first coupling portion 24 is referred to as first coupling portions 24 when describing FIG. 3.

Referring to FIG. 3, the second sensing cells 32 may have a multi-layer structure including a first conductive layer 32a, a second conductive layer 32b, and a third conductive layer 32c. The first coupling portions 24 may have a single layer structure including one conductive layer.

The first conductive layer 32a, the second conductive layer 32b, and the third conductive layer 32c in FIG. 3 may be conductive layers disposed in the same layers as the first conductive layer 22a, the second conductive layer 22b, and the third conductive layer 22c, respectively, in FIG. 2.

The second sensing cells 32 may be alternately disposed to not overlap the first sensing cells 22 as shown in FIG. 1. Since a cross section structure of the second sensing cells 32 may be substantially the same as a cross section structure of the first sensing cells 22 as previously described with reference to FIG. 2, details of the cross section structure of the second sensing cells 32 will be omitted to avoid obscuring exemplary embodiments disclosed herein.

The first coupling portions 24 may have single layer structure implemented with first conductive layers 22a and 32a or second conductive layers 22b and 32b as the second coupling portions 34 shown in FIG. 2.

However, as shown in FIG. 1, since the first coupling portions 24 and the second coupling portions 34 may be alternately disposed, the first coupling portions 24 and the second coupling portions 34 may be disposed on different layers with at least a second passivation layer 14 interposed between the first coupling portions 24 and the second coupling portions 34 in order to prevent short circuiting between the first and second sensing electrodes 20 and 30.

For example, if the second coupling portions 34 have a single layer structure implemented with the second conductive layer 22b of an upper portion of the second passivation layer 14 as shown in FIG. 2, the first coupling portions 24 may have single layer structure implemented with the first conductive layer 32a of an upper portion of the first passivation layer 12 as shown in FIG. 3.

Figure 4:
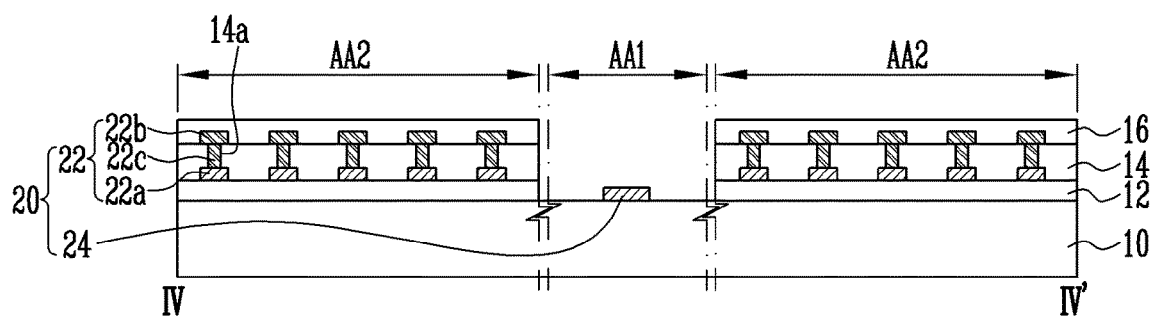
FIG. 4 is a cross-sectional view of the flexible touch screen panel of FIG. 1 taken along sectional line IV-IV' according to one or more exemplary embodiments.

FIG. 4 is a cross-sectional view along sectional line IV-IV' shown in FIG. 1, according to one or more exemplary embodiments. When describing FIG. 4, details on the similar features as FIGS. 2 and 3 will be omitted to avoid obscuring exemplary embodiments disclosed herein.

Referring to FIG. 4, first sensing electrodes 20 may be implemented to have a single layer structure in a first section AA1 and multi-layer structure in a second section AA2.

As described with reference to FIGS. 1 to 3, while only a single layer structure is needed for the first coupling portions 24 formed in the first section AA1, first and second sensing cells 22 and 32 and first and second coupling portions 24 and 34 are formed in the section AA2 creating the need for a multi-layer structure.

Accordingly, the first sensing electrodes 20 may be implemented to have single layer structure in the first section AA1 and a multi-layer structure in the section AA2. In other words, the multi-layer structure is in an area where the first sensing cells 22 are formed. Also, the first sensing electrodes 20 may partially be implemented to have a single layer structure area portion of the second section AA2 (i.e., in an area where the first coupling portions 24 are formed).

In one or more exemplary embodiments, at least one layer among first, second, and third passivation layers 12, 14, and 16 is formed of an inorganic layer having a sufficient thickness to previous short circuiting of the various components of the device. At least one of the first, second, and third passivation layers 12, 14, and 16 may be partially removed from the first section AA1.

In particular, as shown in FIG. 4, the first, second, and third passivation layers 12, 14, and 16 may be removed from the first section AA1. In this manner, the stacking structure and thickness of the first section AA1 may be minimized (or at least reduced). Thus, the mechanical bending stress may be reduced in the first section AA1 by approximately 10%.

FIGS. 5, 6, 7, and 8 are respective plan views illustrating flexible touch screen panels according to various exemplary embodiments. When describing FIGS. 5 to 8, details on similar features as FIG. 1 will be omitted to avoid obscuring exemplary embodiments disclosed herein.

Figure 5:
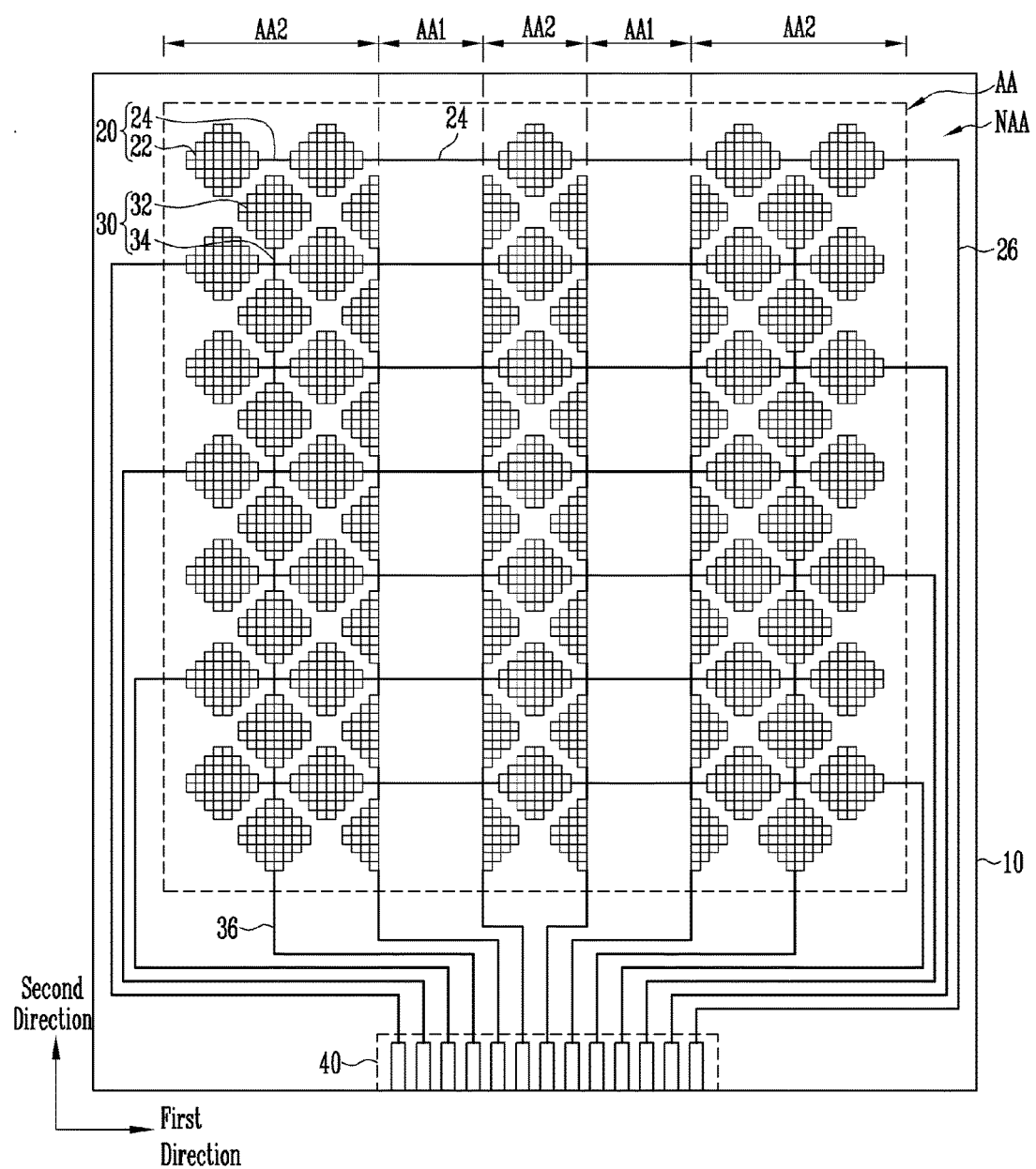
FIGS. 5, 6, 7, and 8 are respective plan views illustrating flexible touch screen panels, according to various exemplary embodiments.

Referring to FIG. 5, the active area AA may include multiple first sections. The first sections AA1 may be disposed in substantially perpendicular directions. Although only two first sections AA1 are illustrated in FIG. 5 for clarity, exemplary embodiments may include any number of first sections AA1 such as three first sections AA1, four first sections AA1, or ten first sections AA1.

Figure 6:
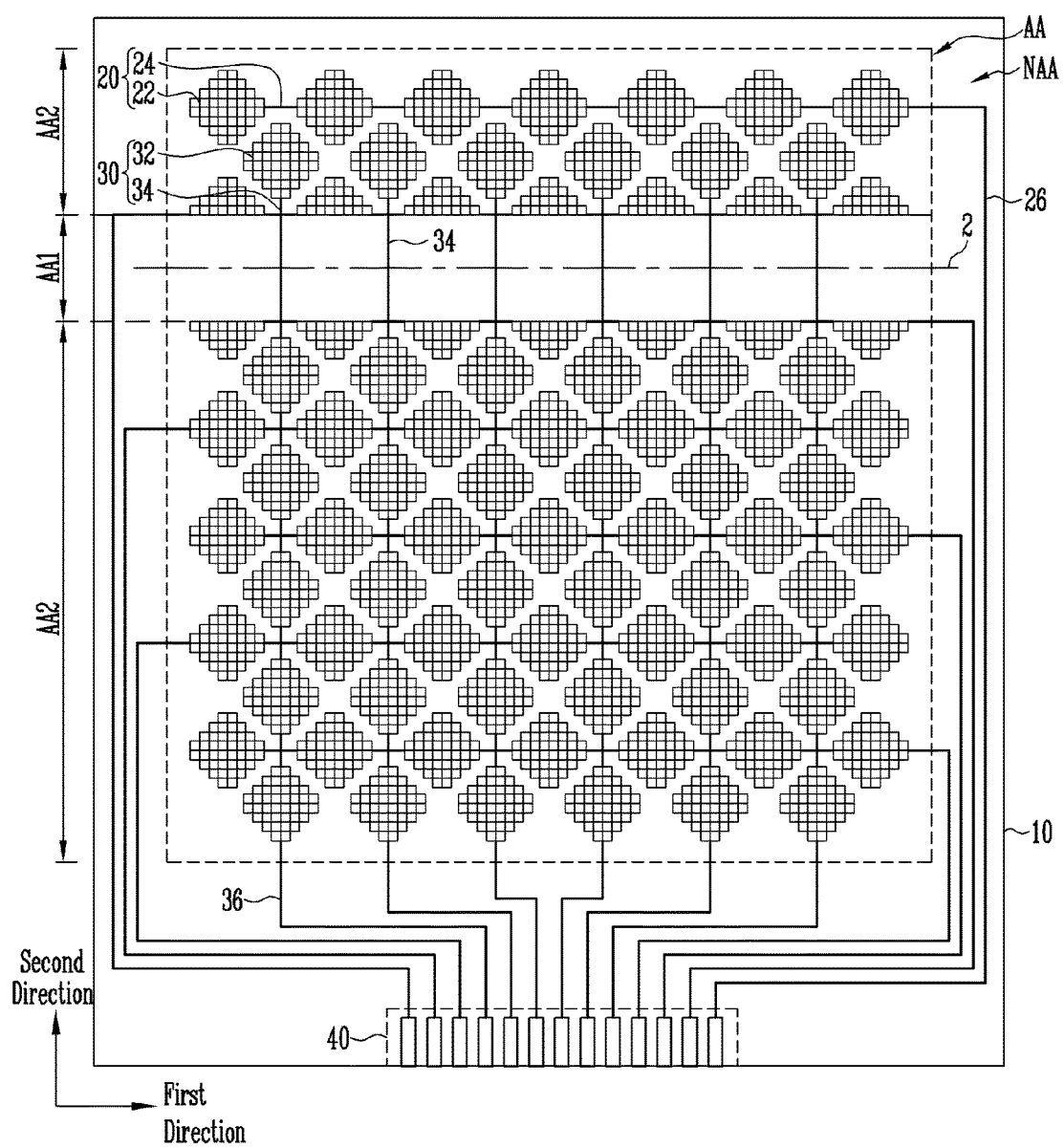

As shown in FIG. 6, the active area AA may include a first section AA1 disposed in a different direction. For example, the first section AA1 is disposed in a horizontal direction (or substantially horizontal direction) as opposed to the vertical direction (or substantially vertical direction) shown in FIG. 1. As shown in FIG. 6, the first section AA1 may be parallel to a first direction which is the same direction that the first sensing electrodes 20 are coupled. In this case, because the second sensing electrodes 30 need to be coupled in a second direction by crossing the first section AA1, only second coupling portions 34, instead of first coupling portions 24, may be formed in the first section AA1. The first and second sensing cells 22 and 32 and the first coupling portions 24 may be removed from the first section AA1. In this case, a preset bending axis 2 may be disposed along a first direction in the first section AA1.

Figure 7:
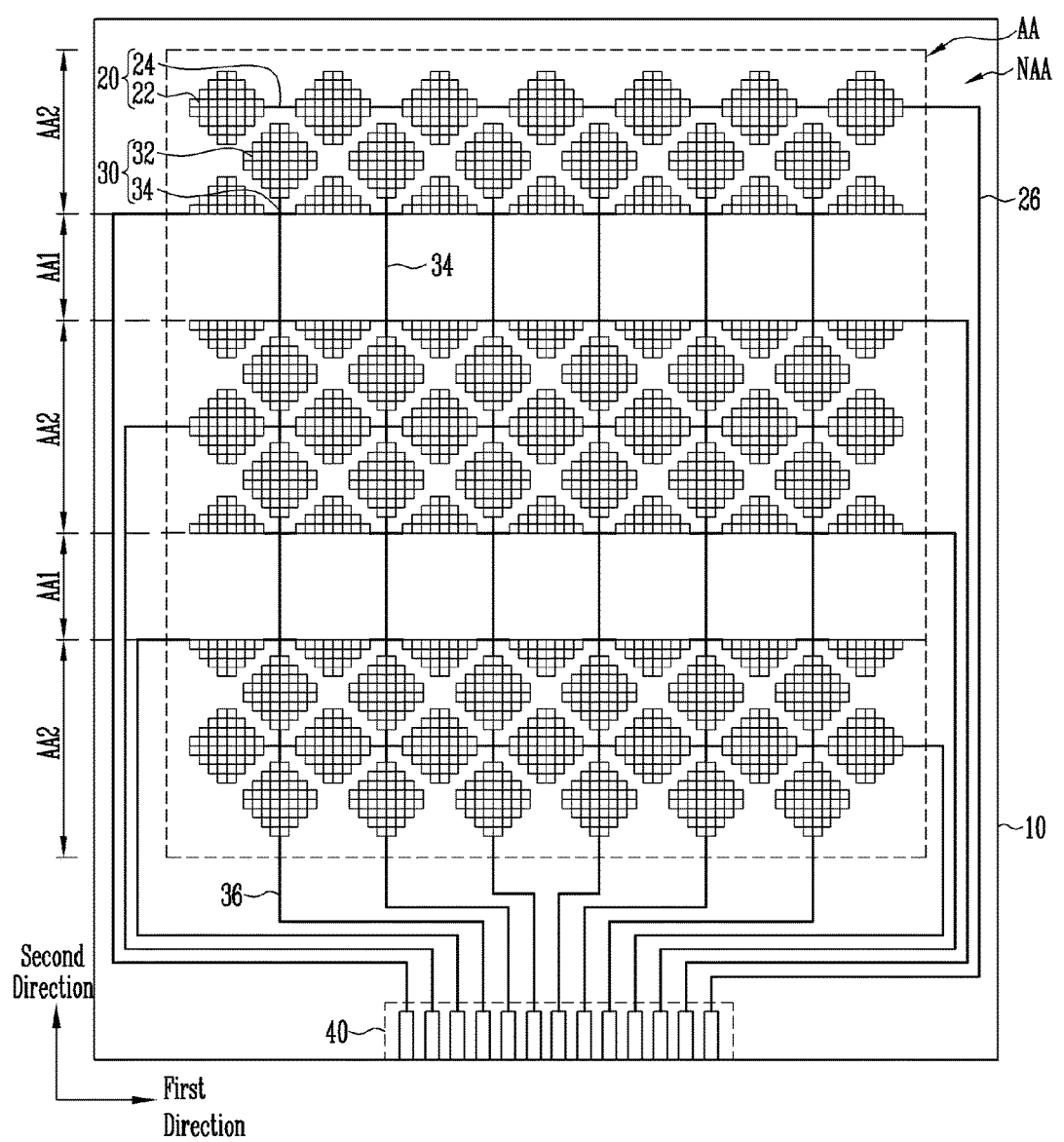
Figure 8:
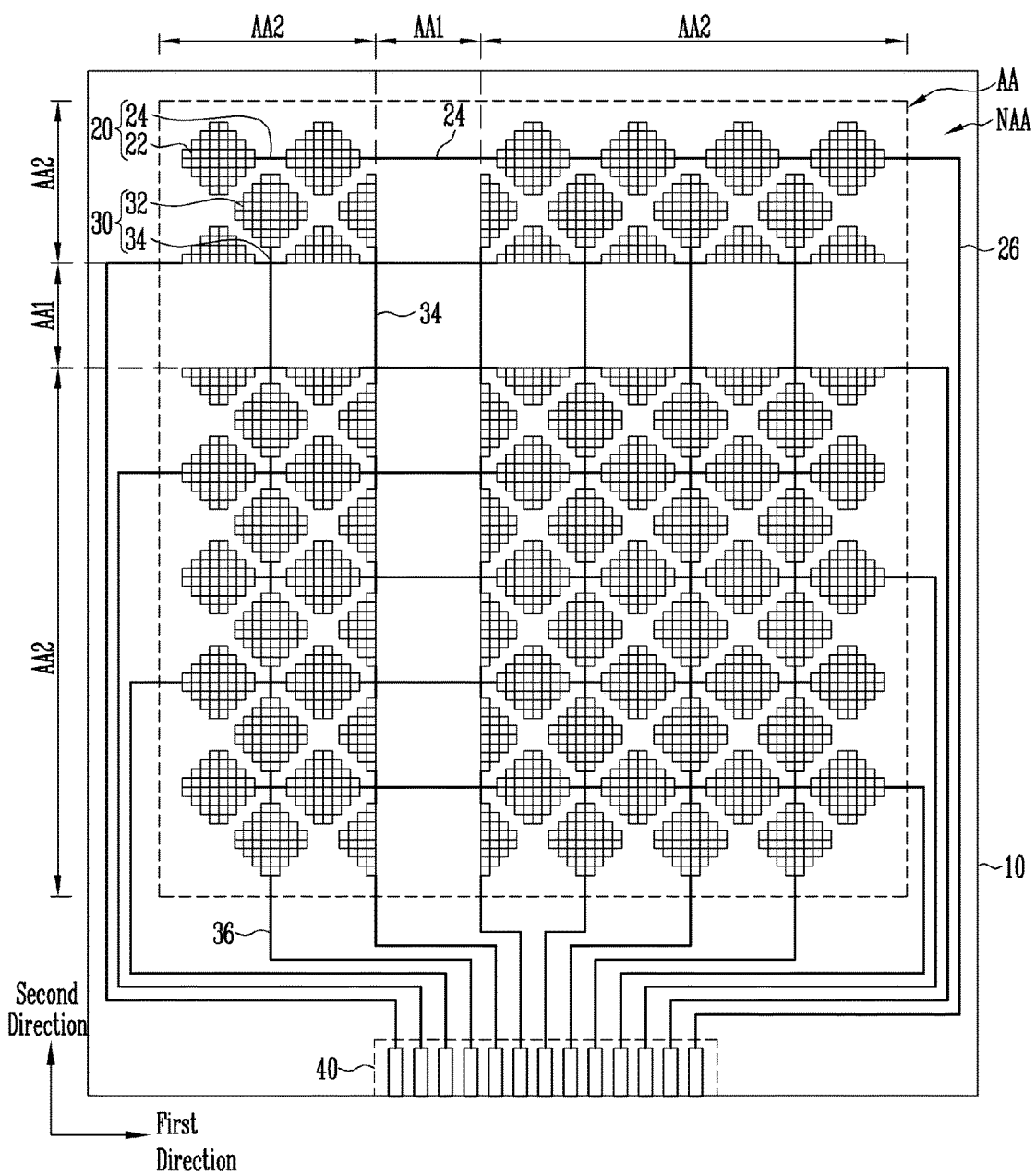

Referring to FIG. 7, the active area AA may include multiple first sections AA1 disposed in a first direction (i.e., substantially horizontal direction). Referring to FIG. 8, the active area AA may include first sections AA1 disposed in two directions crossing each other. For example, the first sections AA1 may be disposed such that at least two first sections AA are substantially perpendicular to one another. When the active area AA includes first sections AA disposed in two directions, the flexible touch screen panel may bend or fold the corresponding two directions. Although only one or two first sections are illustrated and the first sections AA1 are shown only arranged in substantially vertical or horizontal directions, the number, arrangement direction, or position of the first sections AA1 may vary. As a not limiting example, the active area AA may include two first sections AA1 that are not parallel or orthogonal to one another.

Figure 9:
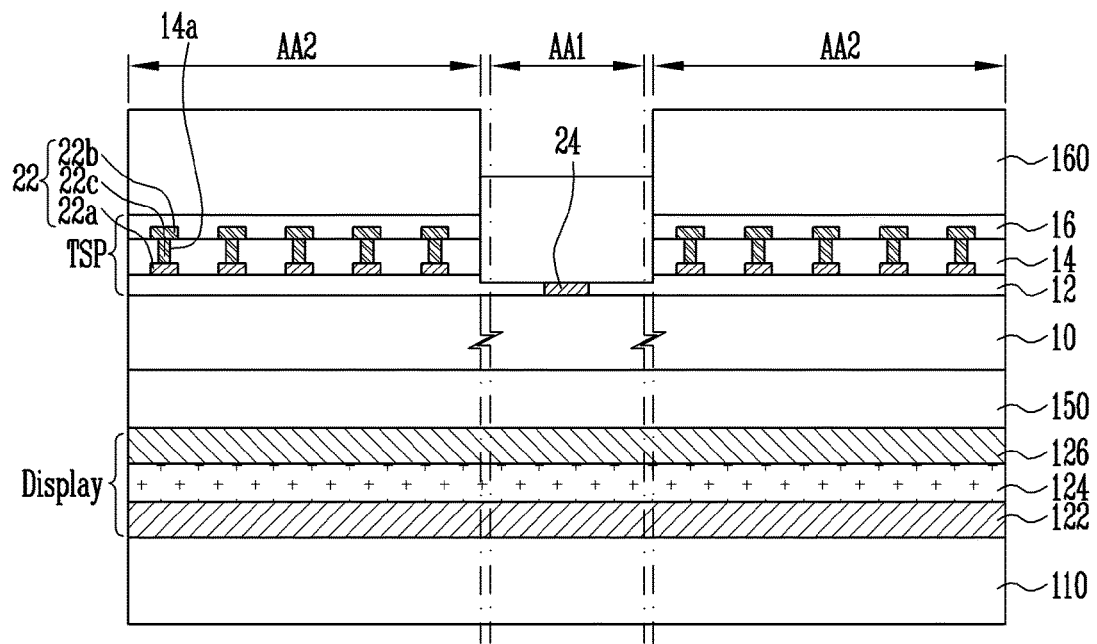
FIGS. 9, 10, 11, 12, and 13 are respective cross-sectional views of flexible touch screen display devices according to various exemplary embodiments.

FIG. 9 is a cross-sectional view illustrating a flexible touch screen display device according to one or more exemplary embodiments. FIG. 9 illustrates a flexible touch screen display device having a flexible touch screen panel shown in FIGS. 1 to 4 in a single body. FIG. 9 uses the same reference numerals similar features in FIG. 4. For brevity, similar features will be omitted to avoid obscuring exemplary embodiments disclosed herein.

Referring to FIG. 9, a flexible touch screen display device may include a first substrate 110, and a second substrate 10 facing the first substrate 110, a display pattern layer (labeled as "Display" in FIG. 9) formed between the first substrate 110 and the second substrate 10, and a touch screen pattern layer TSP formed on the second substrate 10.

To increase the flexibility of the touch screen display device, the first substrate 110 and the second substrate 10 may be thin film substrates.

The display pattern layer and the touch screen pattern layer TSP may be formed in an active area AA configured to display images as well as sensing touch input.

The display pattern layer may be a pixel layer of an organic light emitting diode display device. In this case, the display pattern layer may include a first pixel electrode layer 122 (e.g., a anode electrode) disposed on the first substrate 110, an emission layer 124 disposed on the first pixel electrode layer 122, and a second pixel electrode layer 126 (e.g., a cathode electrode) disposed on the emission layer 124. For clarity, FIG. 9 does not illustrate the first pixel electrode layer 122, the emission layer 124, and the second pixel electrode layer 126 as being patterned. However, at least one of the first pixel electrode layer 122, the emission layer 124, and the second pixel electrode layer 126 may be patterned to correspond to emission area of each pixel.

In one or more exemplary embodiments, a capping layer 150, is further disposed between the second pixel electrode layer 126 and the second substrate 10. Although not illustrated, a pixel circuit part having a thin film transistor, may be disposed between the first substrate 110 and the first pixel electrode layer 122.

In one or more exemplary embodiments, the second substrate 10 is a thin film encapsulation substrate. A touch screen display device may have improved flexibility and reduced thickness if the second substrate 10 is implemented as a thin film encapsulation substrate.

The touch screen pattern layer TSP may be directly disposed on the second substrate 10. More specifically, the second substrate 10 used as an upper substrate of the display panel may be used as a base substrate of the touch screen panel. In this case, the flexible touch screen display device may be implemented in a single body with the flexible touch screen panel. Implementing a touch screen display device as a single body touch screen panel may reduce the overall thickness of the device. The touch screen pattern layer TSP may be formed in the active area AA on the second substrate 10. As shown in FIG. 1, such touch screen pattern layer TSP may include first and second sensing electrodes 20 and 30 coupled in directions that cross each other.

In one or more exemplary embodiments only first coupling portions 24 are disposed in the first section. The first sensing cells 22, the first coupling portions 24, the second sensing cells 32, and the second coupling portions 34 may be disposed in the second section AA2. More specifically, the second sensing electrodes 30 may be disposed outside the first section AA1.

The flexible touch screen display device may have different stack structures in the first section AA1 and the second section AA2. More specifically, the first section AA1 may be designed to include only a portion of multi-layer films among multi-layer films forming stack structure of the second section AA2. For example, the display pattern layer may be disposed in both the first and second sections AA1 and AA2, but the touch screen pattern layer TSP may have different stack structures in the first section AA1 and the second section AA2.

In one or more exemplary embodiments, the first sensing electrodes 20 that cross the first section AA1 may have different stack structures in the first section AA1 and the second section AA2 as described with reference to FIG. 4. For example, the first sensing electrodes 20 may be implemented to have a single layer structure where only the coupling portions 24 are arranged in the first section AA1 and to have multi-layer structure forming sensing cells 22 in the second section AA2.

In one or more exemplary embodiments, the second sensing electrodes 30 are partially removed from the first section AA1. In one or more exemplary embodiments, a polarizing plate 160 may be further included on an upper portion of the touch screen pattern layer TSP.

As described above, the flexible touch screen display device may have different stack structures in the first section AA1 and the second section AA2. More specifically, only a portion of multi-layer films among the multi-layer films formed in the second section AA2 may be formed in the first section AA1. Accordingly, the stack structure of the first section AA1 is simplified, thereby reducing the thickness of the first section AA1 and the mechanical bending stress.

FIGS. 10, 11, 12, and 13 are cross-sectional views illustrating flexible touch screen display devices according to various exemplary embodiments. When describing FIGS. 10 to 13, similar features of FIG. 9 will be omitted to avoid obscuring exemplary embodiments disclosed herein.

Figure 10:
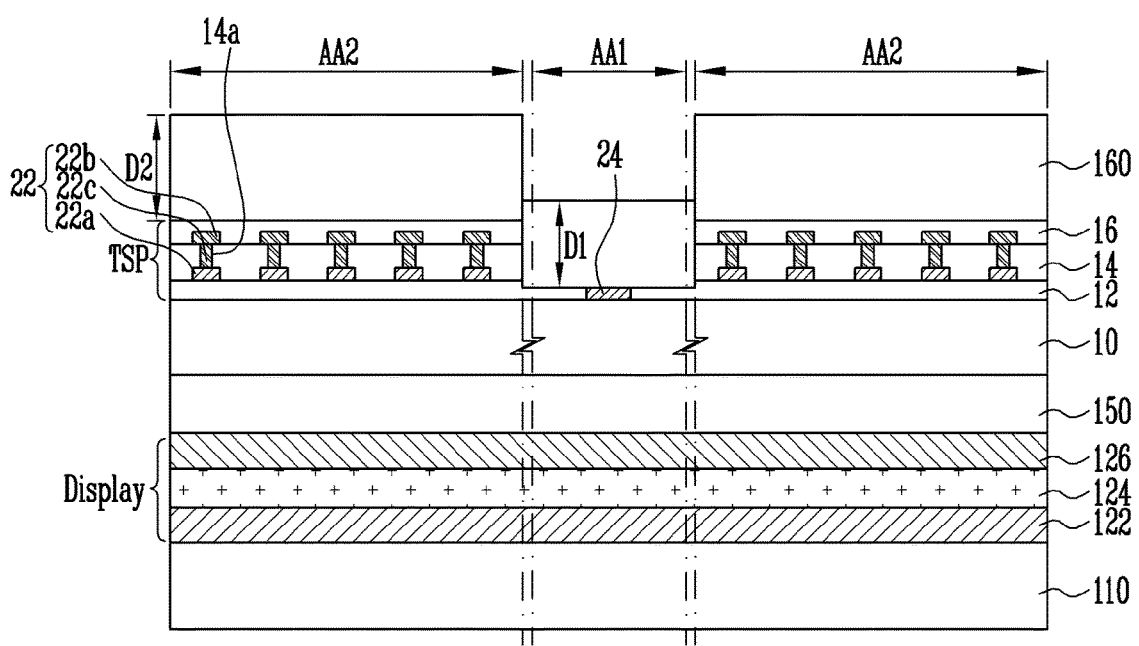

Referring to FIG. 10, a polarizing plate 160 may be formed to have a different thickness in a first section AA1 than in a second section AA2. More specifically, a thickness D1 of the polarizing plate 160 in the first section AA1 may be smaller than a thickness D2 of the polarizing plate 160 in the second section AA2. By reducing the thickness of the first section AA1, mechanical bending stress in the first section AA1 may be reduced.

Figure 11:
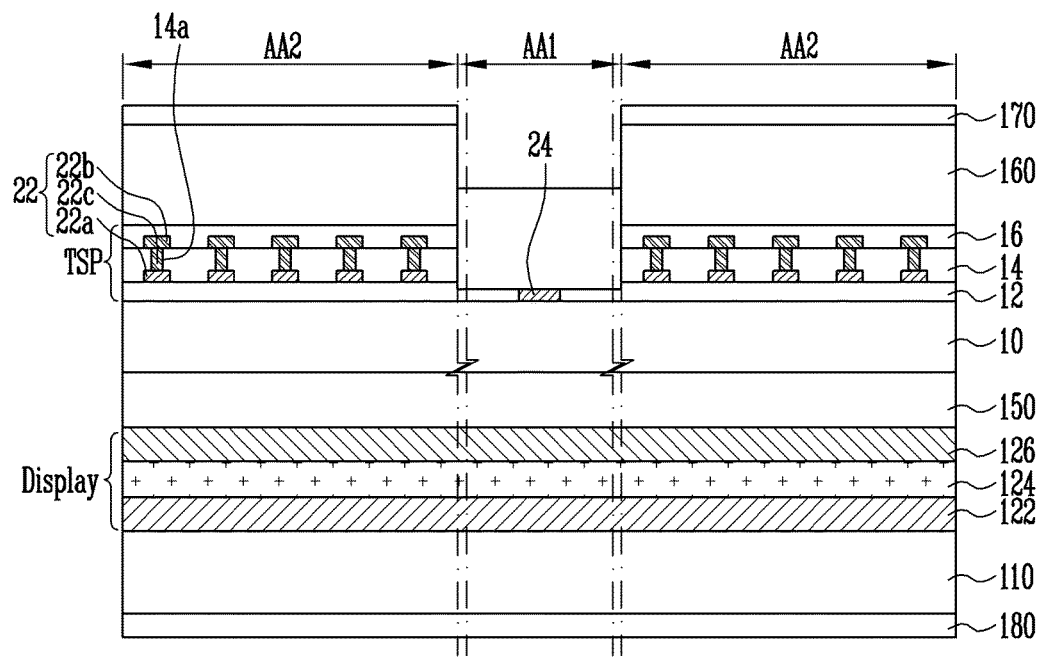
Figure 12:
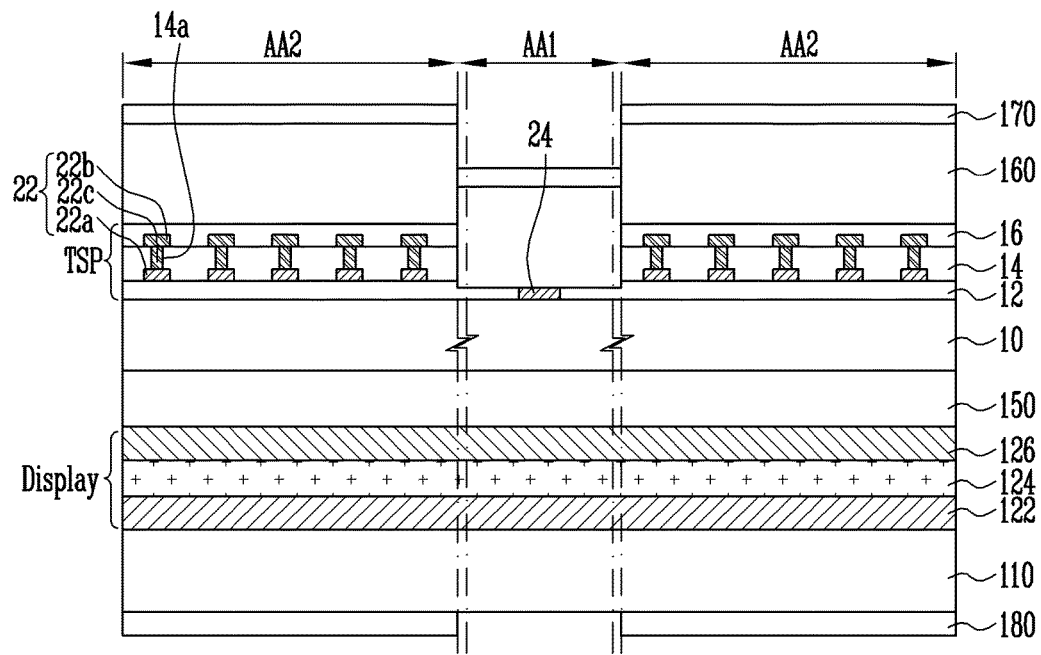
Figure 13:
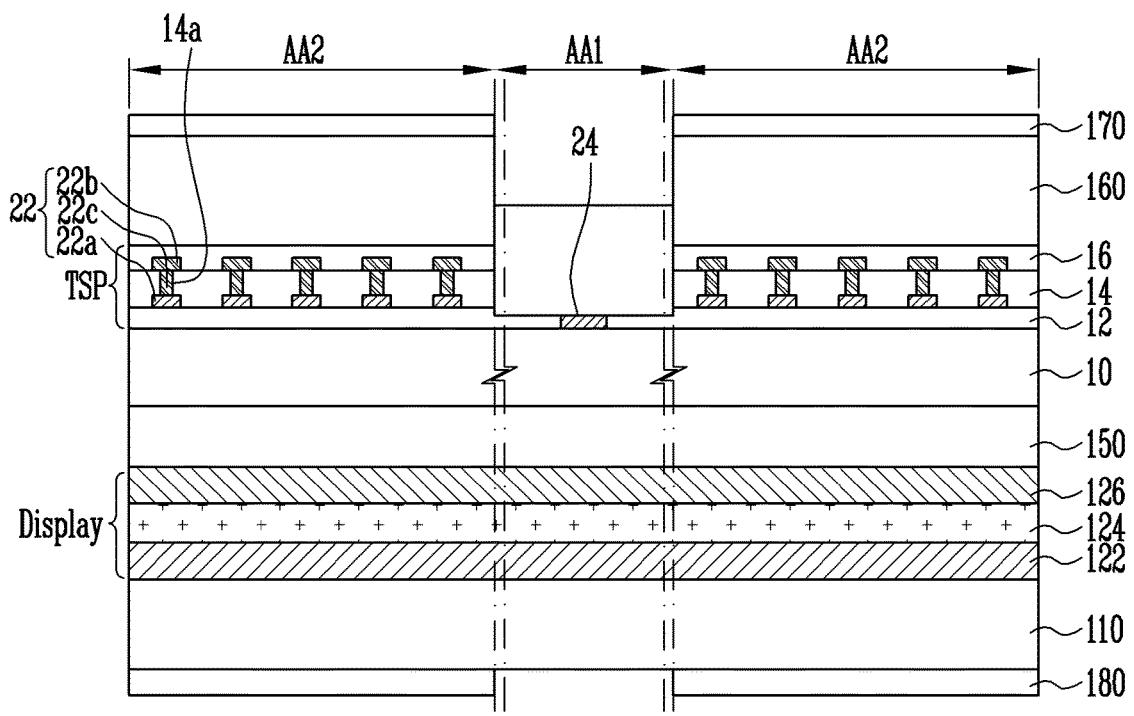

Referring to FIGS. 11 to 13, the flexible touch screen display device may further include upper and/or lower protective films 170 and 180 included on an upper portion of the touch screen pattern layer TSP and/or a lower portion of the first substrate 110.

In one or more exemplary embodiments, the upper and/or lower protective films 170 and 180 are partially removed from the first section AA1. More specifically, the upper and/or lower protective films 170 and 180 may include an open area disposed in the first section AA1.

For example, as shown in FIG. 11, an open area may be included in the upper protective film 170. In other words, FIG. 11 shows the upper protective film 170 may be removed from first section AA1 or not disposed in the first section AA1 but may be disposed in the second section AA2. However, FIG. 11 shows the lower protective film 180 may not be removed from the first section AA1. FIG. 12 illustrates that an open area may be included in the lower protective film 180 as the lower protective film 180 is removed from the first section AA1 or not disposed in the first section AA1, but may be disposed in the second section AA2. However, FIG. 12 shows that the upper protective film 170 may not be removed from the first section AA1.

As shown in FIG. 13, an open area may be included in the upper and lower protective films 170 and 180 as the upper and lower protective films 170 and 180 are removed from the first section AA1 or not disposed in the first section AA1 but may be disposed in the second section AA2.

Even in the case of including the upper and/or lower protective films 170 and 180, as the upper and/or lower protective films 170 and 180 are partially removed from the first section AA1, stack structure of the first section AA1 may be simplified and thickness may be reduced. Accordingly, the mechanical bending stress may be reduced in the first section AA1.

By way of summation and review, a touch screen panel and a touch screen display device may include multiple electrode and passivation layers. Thus, there may be a limit as to how much a thickness of the touch screen panel and the touch screen display device can be minimized. As such, it may be difficult to create a touch screen display device or a touch screen panel that has sufficient flexibility. In addition, the flexible touch screen panel and the flexible touch screen display device typically suffer from large amounts of mechanical bending stress when the flexible touch screen panel and the flexible touch screen display device are deformed.

A flexible touch screen panel and a flexible touch screen display device according to one or more exemplary embodiments have different stack structures in the first section AA1 than the second section AA2 of the active area AA. More specifically, only a portion of multi-layer films among the multi-layer films disposed in the second section AA2 may be disposed in the first section AA1. Accordingly, the stack structure of the first section AA1 is simplified with a reduced thickness, thereby reducing mechanical bending stress and increasing the flexibility of the device. Exemplary embodiments discussed above include the flexible touch screen panel and the flexible touch screen display device with the first section AA1 designed to be flexible, thereby reducing mechanical bending stress.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A flexible touch screen panel, comprising:
a first section;
a second section adjacent to the first section in a first direction;
a thin film substrate; and
first sensing cells disposed in the second section on a surface of the thin film substrate, the first sensing cells being spaced apart from one another in the first direction and being connected to one another via coupling portions extending in the first direction,
wherein:
the first section is defined by a first stack structure comprising a first coupling portion of the coupling portions;
the second section is defined by a second stack structure comprising a second coupling portion of the coupling portions;
the second stack structure is different from the first stack structure; and
in a direction perpendicular to the surface, the first section is thinner than the second section.

2. The flexible touch screen panel of claim 1, wherein a number of layers forming the first stack structure is less than a number of layers forming the second stack structure.

3. The flexible touch screen panel of claim 1, wherein the first sensing cells are disposed outside the first section.

4. The flexible touch screen panel of claim 3, wherein the first sensing cells comprise a multi-layer structure, the multi-layer structure comprising:
a first conductive layer;
an insulating layer disposed on the first conductive layer;
a second conductive layer disposed on the insulating layer; and
a third conductive layer disposed in a contact hole of the insulation layer, the third conductive layer connecting the first conductive layer and the second conductive layer.

5. The flexible touch screen panel of claim 4, wherein the first coupling portion is a single layer structure extending from the first conductive layer or the second conductive layer.

6. The flexible touch screen panel of claim 1, further comprising:
second sensing cells connected to one another along a second direction,
wherein the second direction crosses the first direction.

7. The flexible touch screen panel of claim 6, wherein:
the second sensing cells are disposed outside the first section; and
the second sensing cells are connected to one another via third coupling portions disposed outside the first section, the third coupling portions extending in the second direction.

8. The flexible touch screen panel of claim 1, wherein the first section is more flexible than the second section.

9. The flexible touch screen panel of claim 1, wherein the first section comprises a bending axis crossing the first direction.

10. The flexible touch screen panel of claim 1, further comprising:
an additional first section,
wherein the second section is disposed between the first section and the additional first section.

11. A flexible touch screen display device, comprising:
a display pattern layer configured to display an image;
a touch screen pattern layer disposed on the display pattern layer, the touch screen pattern layer comprising an area configured to detect a touch interaction; and
a flexible substrate disposed between the display pattern layer and the touch screen pattern layer,
wherein the area comprises:
a first stack structure defining a first-cross section of the touch screen pattern layer, the first cross-section comprising a first surface that is furthest from the display pattern layer; and
a second stack structure defining a second cross-section of the touch screen pattern layer, the second-cross section being adjacent to the first cross-section, the second cross-section comprising a second surface that is furthest from the display pattern layer, and
wherein the second stack structure is thicker than the first stack structure such that the second surface is further from the display pattern layer than the first surface.

12. The flexible touch screen display device of claim 11, wherein:
the area comprises first sensing electrodes disposed in the first cross-section and the second cross-section, the first sensing electrodes being connected to one another along a first direction; and
the first sensing electrodes comprise the first stack structure and the second stack structure.

13. The flexible touch screen display device of claim 12, wherein:
the first stack structure is a single layer structure; and
the second stack structure is a multi-layer structure.

14. The flexible touch screen display device of claim 12, wherein:
the area further comprises second sensing electrodes disposed outside the first cross-section; and
the second sensing electrodes are connected to one another along a second direction crossing the first direction.

15. The flexible touch screen display device of claim 11, wherein:
the second stack structure is a multi-layer structure; and
the first section comprises less than all layers of the multi-layer structure.

16. The flexible touch screen display device of claim 11, further comprising:
a polarizing plate disposed on the touch screen pattern layer,
wherein, in the direction perpendicular to the first surface, the polarizing plate is thinner in the first section than in the second section.

17. The flexible touch screen display device of claim 11, further comprising:
a protective film,
wherein the touch screen pattern layer is disposed between the protective film and the flexible substrate or the display pattern layer is disposed between the protective film and the touch screen pattern layer.

18. The flexible touch screen display device of claim 17, wherein the protective film comprises an opening overlapping the first cross-section.

19. The flexible touch screen display device of claim 11, wherein:
the first cross-section is disposed in a flexible portion of the flexible touch screen display device; and
the second cross-section is disposed in a rigid portion of the flexible touch screen display device.

* * * * *